W. DAVIES.
TOBACCO STRIPPING AND DRYING MACHINES.
No. 194,134. Patented Aug. 14, 1877.
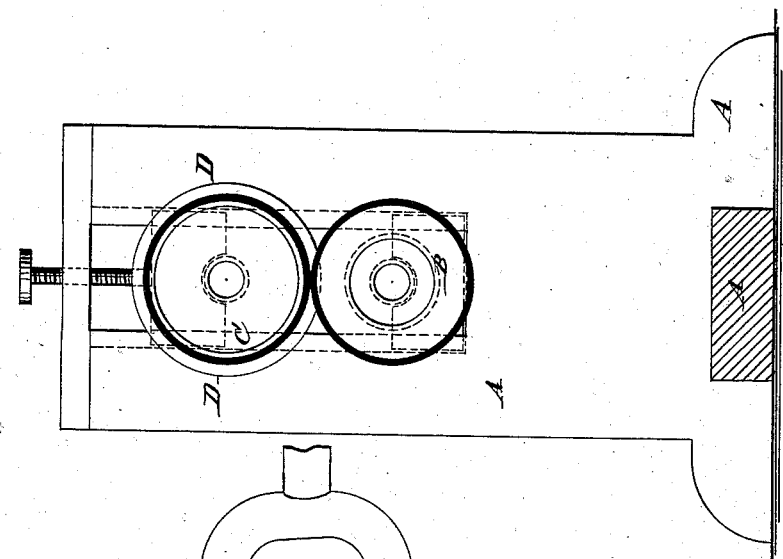
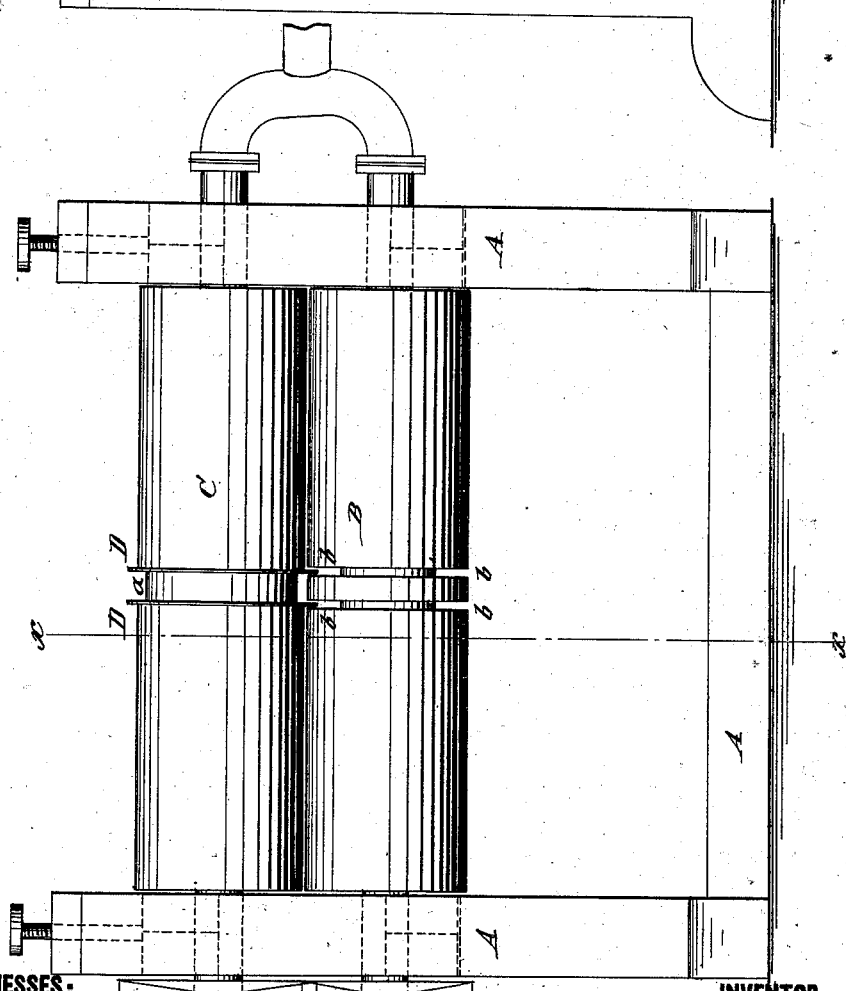

UNITED STATES PATENT OFFICE.

WILLIAM DAVIES, OF HENDERSON, KENTUCKY.

IMPROVEMENT IN TOBACCO STRIPPING AND DRYING MACHINES.

Specification forming part of Letters Patent No. 194,134, dated August 14, 1877; application filed June 4, 1877.

*To all whom it may concern:*

Be it known that I, WILLIAM DAVIES, of Henderson, in the county of Henderson and State of Kentucky, have invented a new and Improved Tobacco Stripping and Drying Machine, of which the following is a specification:

In the accompanying drawing, Figure 1 represents a side elevation of my improved tobacco stripping and drying machine; and Fig. 2, a vertical transverse section of the same on line $x\,x$, Fig. 1.

Similar letters of reference indicate corresponding parts.

This invention relates to improved appliances for extracting or separating the stems from leaf-tobacco, and for rolling out or flattening and drying the leaves at the same time, so as to be readily booked for market.

The invention consists of hollow heated and revolving rolls, of which one has an annular groove and circumferential cutting-knives at both sides thereof, said knives registering with corresponding circumferential recesses of the other roll.

In the drawing, A represents suitable standards, with adjustable bearings for the stripping and drying rolls B and C. The rolls B and C are of any desired length or diameter, and revolved by hand, steam, or any other power, and by any suitable gearing in opposite direction to each other. The rolls B and C are made hollow, and heated by steam or other agency, for the purpose of rolling out or flattening and drying the leaf-tobacco fed through between the rolls. The roll C is provided with circular knives D that revolve therewith, and extend beyond the periphery of the roll, being either fixed or adjustable as to the distance apart, and separated by a circumferential groove or indentation, $a$, that may be in the upper or lower roller, or both, to allow the passage of the stems or stalks, and prevent their greater thickness from separating the rollers and depriving the leafy portion of the pressure which it may be desirable or necessary to give it. The circumferential knives enter corresponding recesses $b$ of the other roll B, so as to cut out the stems during the passage of the leaves.

The manner of operation is as follows: The operator places one end of the leaf between the rolls, with the stem pointing either end into the space between the knives, the leaf being then caught and drawn through between the rolls. As the leaf passes into the rolls it is stretched out to its natural limits either by the hands of the operator or by rollers with diagonal grooves or otherwise.

The leaf will be delivered at the other side of the rolls, stripped clean from the stems, and in flattened and dried condition, so as to be ready for packing.

The cutting-knives of one roll pass alongside the sharp edges of the corresponding grooves of the other roll, and produce the required scissor-action, so as to neatly strip the stem from the leaf.

The heat of the rollers dries the leaf at the same time, and dispenses, thereby, with the separate drying operation.

Having thus described my invention, I claim as new and desire to secure by Letters Patent—

A machine for stripping and drying leaf-tobacco, consisting, essentially, of revolving and heated rolls, of which one roll has circumferential stripping-knives and an intermediate groove or indentation, and the other roll circumferential grooves or recesses registering with the knives, substantially in the manner and for the purpose set forth.

WILLIAM DAVIES.

Witnesses:
ROBERT DIXON,
B. HIGGINBOTHAM.